United States Patent
Kim et al.

(10) Patent No.: US 10,098,081 B2
(45) Date of Patent: Oct. 9, 2018

(54) METHOD AND DEVICE FOR SHIFTING STATE OF NAN TERMINAL IN WIRELESS COMMUNICATION SYSTEM

(71) Applicant: LG ELECTRONICS INC., Seoul (KR)

(72) Inventors: Dongcheol Kim, Seoul (KR); Byungjoo Lee, Seoul (KR); Giwon Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 143 days.

(21) Appl. No.: 15/108,435

(22) PCT Filed: Feb. 6, 2015

(86) PCT No.: PCT/KR2015/001243
§ 371 (c)(1),
(2) Date: Jun. 27, 2016

(87) PCT Pub. No.: WO2015/119454
PCT Pub. Date: Aug. 13, 2015

(65) Prior Publication Data
US 2016/0330701 A1 Nov. 10, 2016

Related U.S. Application Data

(60) Provisional application No. 61/936,886, filed on Feb. 7, 2014.

(51) Int. Cl.
*H04W 56/00* (2009.01)
*H04W 8/00* (2009.01)
*H04W 84/12* (2009.01)

(52) U.S. Cl.
CPC ......... *H04W 56/001* (2013.01); *H04W 8/005* (2013.01); *H04W 84/12* (2013.01)

(58) Field of Classification Search
CPC .... H04W 56/001; H04W 8/005; H04W 84/12
See application file for complete search history.

(56) References Cited

U.S. PATENT DOCUMENTS 9,544,754 B1 * 1/2017 Lambert ............... H04W 8/005
2011/0161697 A1   6/2011 Qi et al.
(Continued)

FOREIGN PATENT DOCUMENTS

| KR | 10-2010-0125103 A | 11/2010 |
| KR | 10-2012-0099985 A | 9/2012 |
| KR | 10-1343071 B1     | 12/2013 |

*Primary Examiner* — Edan Orgad
*Assistant Examiner* — Ivan O Latorre
(74) *Attorney, Agent, or Firm* — Birch, Stewart, Kolasch & Birch, LLP

(57) ABSTRACT

One embodiment of the present invention relates to a method for shifting the state of a neighbor awareness networking (NAN) terminal in a wireless communication system, comprising the steps of: receiving a first synchronization beacon frame; and receiving a second synchronization beacon frame after the first sync beacon frame has been received, wherein the state of the NAN terminal is shifted to a state capable of transmitting synchronization beacon frames regardless of a received signal strength indicator (RSSI) of the synchronization beacon frames, when anchor master rank information included in the first synchronization beacon frame and anchor master rank information included in the second synchronization beacon frame are different, and the NAN terminal is in a non-master non-sync state.

10 Claims, 8 Drawing Sheets

(56) References Cited

U.S. PATENT DOCUMENTS

| | | | |
|---|---|---|---|
| 2013/0329600 A1 | 12/2013 | Vedula et al. | |
| 2014/0119357 A1* | 5/2014 | Abraham | H04W 56/001 370/338 |
| 2014/0293992 A1* | 10/2014 | Abraham | H04W 52/0225 370/350 |
| 2014/0313966 A1* | 10/2014 | Shukla | H04W 48/10 370/312 |
| 2015/0098388 A1* | 4/2015 | Fang | H04W 48/16 370/328 |
| 2015/0163828 A1* | 6/2015 | Vandwalle | H04W 28/044 370/330 |
| 2015/0172391 A1* | 6/2015 | Kasslin | H04L 67/16 370/338 |
| 2017/0223704 A1* | 8/2017 | Du | H04L 1/1812 |

\* cited by examiner

METHOD AND DEVICE FOR SHIFTING STATE OF NAN TERMINAL IN WIRELESS COMMUNICATION SYSTEM

CROSS REFERENCE TO RELATED APPLICATIONS

This application is the National Phase of PCT/KR2015/001243 filed on Feb. 6, 2015, which claims priority under 35 U.S.C. § 119(e) to U.S. Provisional Application No. 61/936,886 filed on Feb. 7, 2014, all of which are hereby expressly incorporated by reference into the present application.

TECHNICAL FIELD

The present invention relates to a wireless communication system, and more particularly, to a method and device for performing a state transition of a NAN (neighbor awareness networking) terminal.

BACKGROUND ART

Recently, various wireless communication technologies have been developed with the advancement of information communication technology. Among the wireless communication technologies, a wireless local area network (WLAN) is the technology capable of accessing the Internet by wireless in a home, a company or a specific service provided area through portable terminal such as a personal digital assistant (PDA), a laptop computer, a portable multimedia player (PMP), etc. based on a radio frequency technology.

DISCLOSURE OF THE INVENTION

Technical Task

The technical task of the present invention is to define a method for a NAN terminal to perform a state transition.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In a first technical aspect of the present invention, provided herein is a method for performing a state transition, which is performed by a NAN (neighbor awareness networking) terminal in a wireless communication system, including receiving a first synchronization beacon frame; and receiving a second synchronization beacon frame after the reception of the first synchronization beacon frame. If anchor master rank information contained in the first synchronization beacon frame is different from anchor master rank information contained in the second synchronization beacon frame and the NAN terminal is in a Non-Master Non-Sync state, the NAN terminal may transition to a state capable of transmitting a synchronization beacon frame regardless of an RSSI (received signal strength indicator) of the synchronization beacon frame.

In a second technical aspect of the present invention, provided herein is a NAN (neighbor awareness networking) terminal apparatus in a wireless communication system, including: a transmitting module and a processor. The processor may be configured to receive a first synchronization beacon frame and receive a second synchronization beacon frame after the reception of the first synchronization beacon frame. If anchor master rank information contained in the first synchronization beacon frame is different from anchor master rank information contained in the second synchronization beacon frame and the NAN terminal is in a Non-Master Non-Sync state, the NAN terminal may transition to a state capable of transmitting a synchronization beacon frame regardless of an RSSI (received signal strength indicator) of the synchronization beacon frame.

At least one of the following items may be included in the first and second technical aspects of the present invention.

The anchor master information may include an anchor master rank, a hop count to an anchor master, and an anchor master beacon transmission time.

The state capable of transmitting the synchronization beacon frame may correspond to either a Non-Master Sync state or a Master Sync state.

If the anchor master rank information contained in the first synchronization beacon frame is equal to the anchor master rank information contained in the second synchronization beacon frame and the NAN terminal is in the Non-Master Non-Sync state, the NAN terminal may perform the state transition based on an RSSI of the second synchronization beacon frame.

If a state of the NAN terminal is either an anchor master or a master and the NAN terminal fails to transmit discovery beacon frames predetermined times or more during a prescribed period, the NAN terminal may change a master rank value to a predetermined value.

If a value related to a channel state becomes equal to or greater than the predetermined value, the NAN terminal may restore the master rank value to the value before the change.

If the NAN terminal fails to transmit synchronization beacon frames in more than a predetermined number of discovery windows, the NAN terminal may change a master rank value to a predetermined value.

If the NAN terminal enters a power save mode, the NAN terminal may transition to the Non-Master Non-Sync state.

The NAN terminal may transmit only a service discovery frame.

If the RSSI of the second synchronization beacon frame is lower than RSSI_close, an anchor master rank of the second synchronization beacon frame is equal to an anchor master rank of the NAN terminal, and a hop count of the second synchronization beacon frame is lower than a hop count of the NAN terminal, the NAN terminal may transition to a Non-Master Sync state.

If the RSSI of the second synchronization beacon frame is lower than RSSI_close, an anchor master rank of the second synchronization beacon frame is equal to an anchor master rank of the NAN terminal, and a hop count of the second synchronization beacon frame is equal to a hop count of the NAN terminal, and a master rank of the second synchronization beacon frame is higher than a master rank of the NAN terminal, the NAN terminal may transition to a Non-Master Sync state.

Advantageous Effects

According to the present invention, a state transition can be performed rapidly, thereby quickly eliminating a situation in which there are a plurality of anchor masters in a cluster.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 8 is a diagram illustrating a discovery window and the like.

BEST MODE FOR INVENTION

Figure 1:
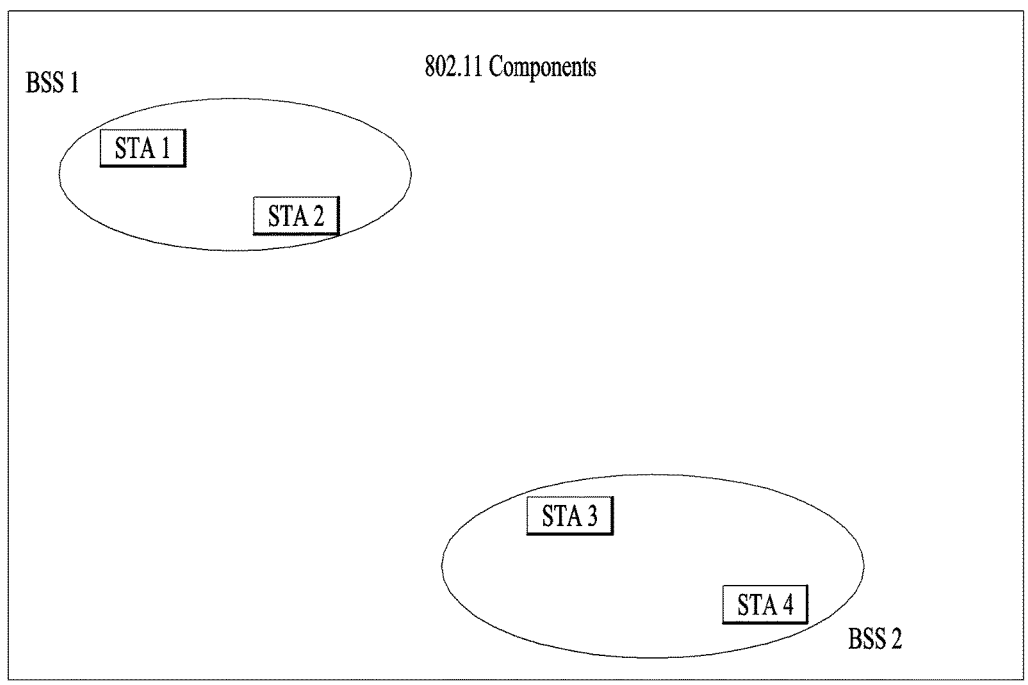
FIG. 1 is a diagram illustrating an exemplary structure of IEEE 802.11 system.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide the full understanding of the present invention. However, it will be apparent to those skilled in the art that the present invention may be implemented without such specific details.

The following embodiments can be achieved by combinations of structural elements and features of the present invention in prescribed forms. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

Specific terminologies in the following description are provided to help the understanding of the present invention. And, these specific terminologies may be changed to other formats within the technical scope or spirit of the present invention.

Occasionally, to avoid obscuring the concept of the present invention, structures and/or devices known to the public may be skipped or represented as block diagrams centering on the core functions of the structures and/or devices. In addition, the same reference numbers will be used throughout the drawings to refer to the same or like parts in this specification.

The embodiments of the present invention can be supported by the disclosed standard documents disclosed for at least one of wireless access systems including IEEE 802 system, 3GPP system, 3GPP LTE system, LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document can be supported by the above standard documents.

The following embodiments of the present invention can be applied to a variety of wireless access technologies, for example, CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. For clarity, the following description focuses on IEEE 802.11 systems. However, technical features of the present invention are not limited thereto.

Structure of WLAN System

FIG. 1 is a diagram illustrating an exemplary structure of IEEE 802.11 system to which the present invention is applicable.

IEEE 802.11 structure may include a plurality of components and WLAN supportive of transparent STA mobility for an upper layer can be provided by interactions between the components. A basic service set (BSS) may correspond to a basic component block in IEEE 802.11 WLAN. FIG. 1 shows one example that two basic service sets BSS 1 and BSS 2 exist and that 2 STAs are included as members of each BSS. In particular, STA 1 and STA 2 are included in the BSS 1 and STA 3 and STA 4 are included in the BSS 2. In FIG. 1, an oval indicating the BSS can be understood as indicating a coverage area in which the STAs included in the corresponding BSS maintain communication. This area may be called a basic service area (BSA). Once the STA moves out of the BSA, it is unable to directly communicate with other STAs within the corresponding BSA.

A most basic type of BSS in IEEE 802.11 WLAN is an independent BSS (IBSS). For instance, IBSS can have a minimum configuration including 2 STAs only. Moreover, the BSS (e.g., BSS 1 or BSS 2) shown in FIG. 1, which has the simplest configuration and in which other components are omitted, may correspond to a representative example of the IBSS. Such a configuration is possible if STAs can directly communicate with each other. Moreover, the above-mentioned WLAN is not configured according to a devised plan but can be configured under the necessity of WLAN. And, this may be called an ad-hoc network.

If an STA is turned on/off or enters/escapes from a BSS area, membership of the STA in a BSS can be dynamically changed. In order to obtain the membership of the BSS, the STA can join the BSS using a synchronization procedure. In order to access all services of the BSS based structure, the STA should be associated with the BSS. This association may be dynamically configured or may include a use of a DSS (distribution system service).

Additionally, FIG. 1 shows components such as a DS (distribution system), a DSM (distribution system medium), an AP (access point) and the like.

In WLAN, a direct station-to-station distance can be restricted by PHY capability. In some cases, the restriction of the distance may be sufficient enough. However, in some cases, communication between stations located far away from each other may be necessary. In order to support extended coverage, the DS (distribution system) may be configured.

The DS means a structure in which BSSs are interconnected with each other. Specifically, the BSS may exist as an extended type of component of a network consisting of a plurality of BSSs instead of an independently existing entity as shown in FIG. 1.

The DS corresponds to a logical concept and can be specified by a characteristic of the DSM. Regarding this, IEEE 802.11 standard logically distinguishes a wireless medium (WM) from the DSM. Each of the logical media is used for a different purpose and is used as a different component. According to the definition of the IEEE 802.11 standard, the media are not limited to be identical to each other or to be different from each other. Since a plurality of the media are logically different from each other, flexibility of IEEE 802.11 WLAN structure (a DS structure or a different network structure) can be explained. In particular, the IEEE 802.11 WLAN structure can be implemented in various ways and the WLAN structure can be independently specified by a physical characteristic of each implementation case.

The DS can support a mobile device in a manner of providing seamless integration of a plurality of BSSs and logical services necessary for handling an address to a destination.

The AP enables associated STAs to access the DS through the WM and corresponds to an entity having STA functionality. Data can be transferred between the BSS and the DS through the AP. For instance, as shown in FIG. 1, while each of the STA 2 and STA 3 have STA functionality, the STA 2 and STA 3 provide functions of enabling associated STAs (STA 1 and STA 4) to access the DS. And, since all APs basically correspond to an STA, all APs correspond to an addressable entity. An address used by the AP for communication in the WM should not be identical to an address used by the AP for communication in the DSM.

Data transmitted from one of STAs associated with an AP to an STA address of the AP is always received in an uncontrolled port and the data can be processed by an IEEE 802.1X port access entity. Moreover, if a controlled port is authenticated, transmission data (or frame) can be delivered to a DS.

Layer Structure

Operations of the STA which operates in a wireless LAN system can be explained in terms of the layer structure. In terms of a device configuration, the layer structure can be implemented by a processor. The STA may have a structure of a plurality of layers. For example, a main layer structure handled in the 802.11 standard document includes a MAC sublayer and a physical (PHY) layer on a data link layer (DLL). The PHY layer may include a physical layer convergence procedure (PLCP) entity, a physical medium dependent (PMD) entity, etc. The MAC sublayer and the PHY layer conceptually include management entities called MAC sublayer management entity (MLME) and physical layer management entity (PLME), respectively. These entities provide a layer management service interface for performing a layer management function.

A station management entity (SME) is present within each STA in order to provide an accurate MAC operation. The SME is a layer-independent entity that may be considered as existing in a separate management plane or as being off to the side. Detailed functions of the SME are not specified in this document but it may be generally considered as being responsible for functions of gathering layer-dependent status from the various layer management entities (LMEs), setting values of layer-specific parameters similar to each other. The SME may perform such functions on behalf of general system management entities and may implement a standard management protocol.

The aforementioned entities interact with each other in various ways. For example, the entities may interact with each other by exchanging GET/SET primitives. The primitive means a set of elements or parameters related to a specific purpose. XX-GET.request primitive is used for requesting a value of a given MIB attribute (management information based attribute). XX-GET.confirm primitive is used for returning an appropriate MIB attribute value if a status is 'success', otherwise it is used for returning an error indication in a status field. XX-SET.request primitive is used to request that an indicated MIB attribute be set to a given value. If this MIB attribute implies a specific action, this requests that the action be performed. And, XX-SET.confirm primitive is used such that, if the status is 'success', this confirms that the indicated MIB attribute has been set to the requested value, otherwise it is used to return an error condition in the status field. If this MIB attribute implies a specific action, this confirms that the action has been performed.

Moreover, the MLME and the SME may exchange various MLME_GET/SET primitives through an MLME SAP (service access point). Furthermore, various PLME_GET/SET primitives may be exchanged between the PLME and the SME through PLME_SAP and may be exchanged between the MLME and the PLME through an MLME-PLME_SAP.

NAN (Neighbor Awareness Network) Topology

Figure 2:
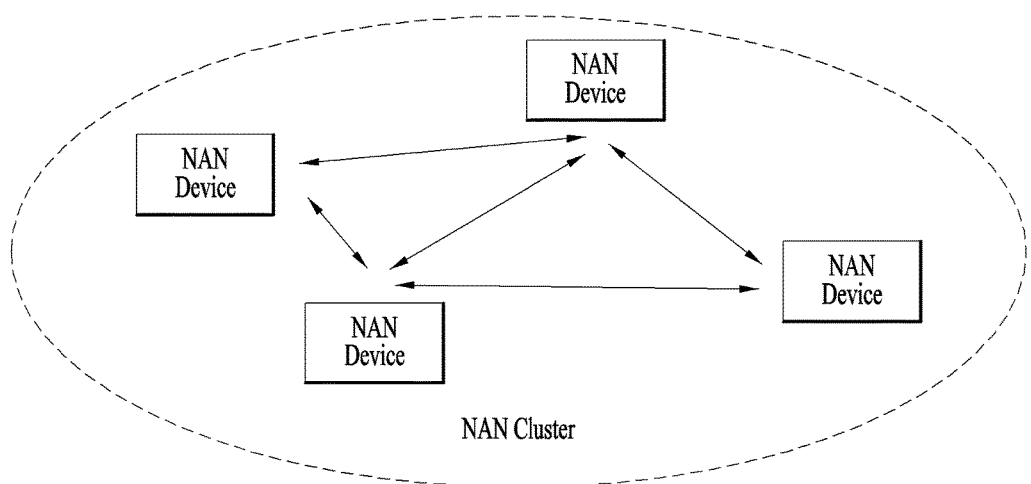
FIGS. 2 and 3 are diagrams illustrating examples of a NAN cluster.
Figure 3:
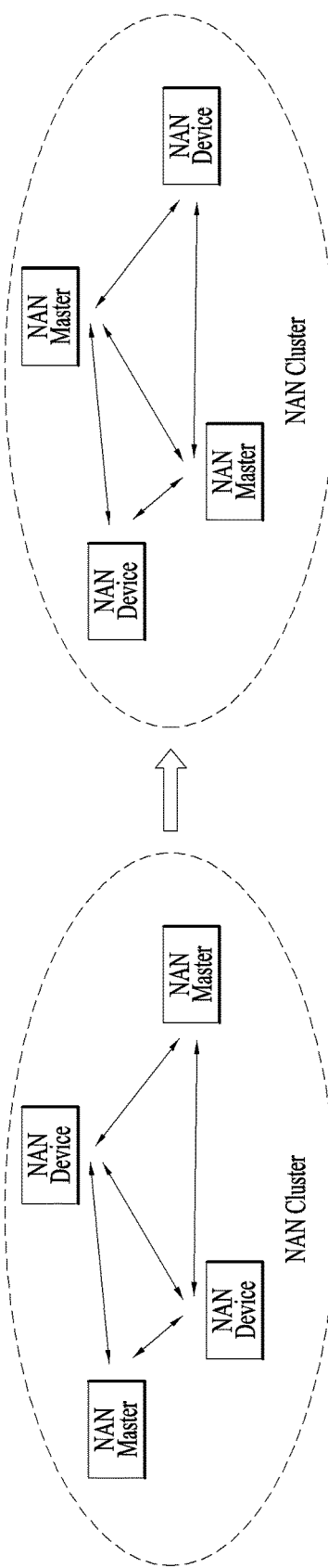

A NAN network can be constructed with NAN devices (terminals) that use a set of identical NAN parameters (e.g., a time interval between consecutive discovery windows, an interval of a discovery window, a beacon interval, a NAN channel, etc.). A NAN cluster can be formed by NAN terminals and the NAN cluster means a set of NAN terminals that are synchronized on the same discovery window schedule. And, a set of the same NAN parameters is used in the NAN cluster. FIG. 2 illustrates an example of the NAN cluster. A NAN terminal included in the NAN cluster may directly transmit a multicast/unicast service discovery frame to a different NAN terminal within a range of the discovery window. As shown in FIG. 3, at least one NAN master may exist in a NAN cluster and the NAN master may be changed. Moreover, the NAN master may transmit all of a synchronization beacon frame, discovery beacon frame and service discovery frame.

NAN Device Architecture

Figure 4:
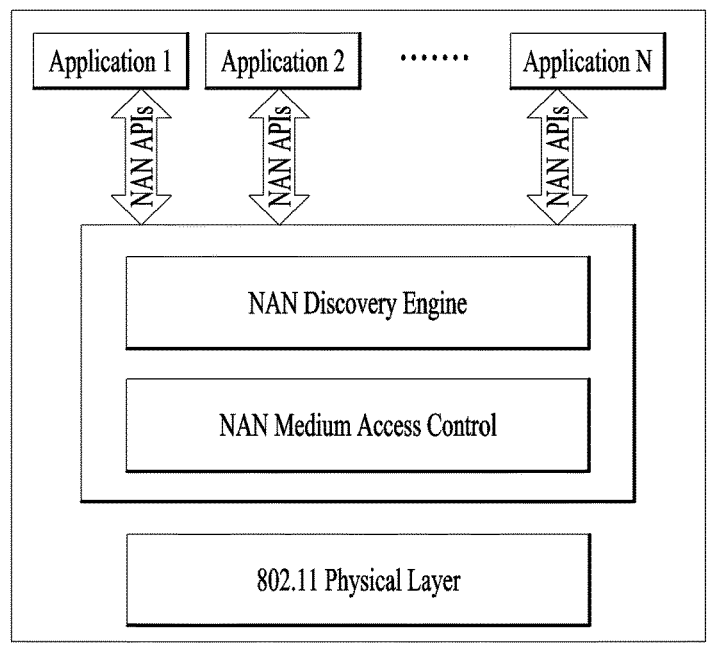
FIG. 4 illustrates an example of a structure of a NAN device (terminal).

FIG. 4 illustrates an example of a structure of a NAN device (terminal). Referring to FIG. 4, the NAN terminal is based on a physical layer in 802.11 and its main components correspond to a NAN discovery engine, a NAN MAC (medium access control), and NAN APIs connected to respective applications (e.g., Application 1, Application 2, . . . , Application N).

Figure 5:
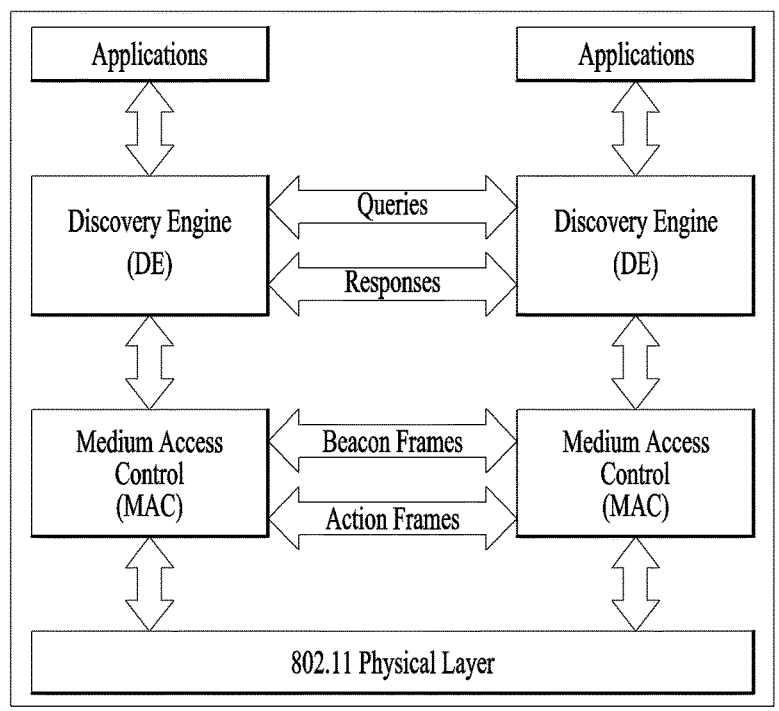
FIGS. 5 and 6 illustrate relations between NAN components.
Figure 6:
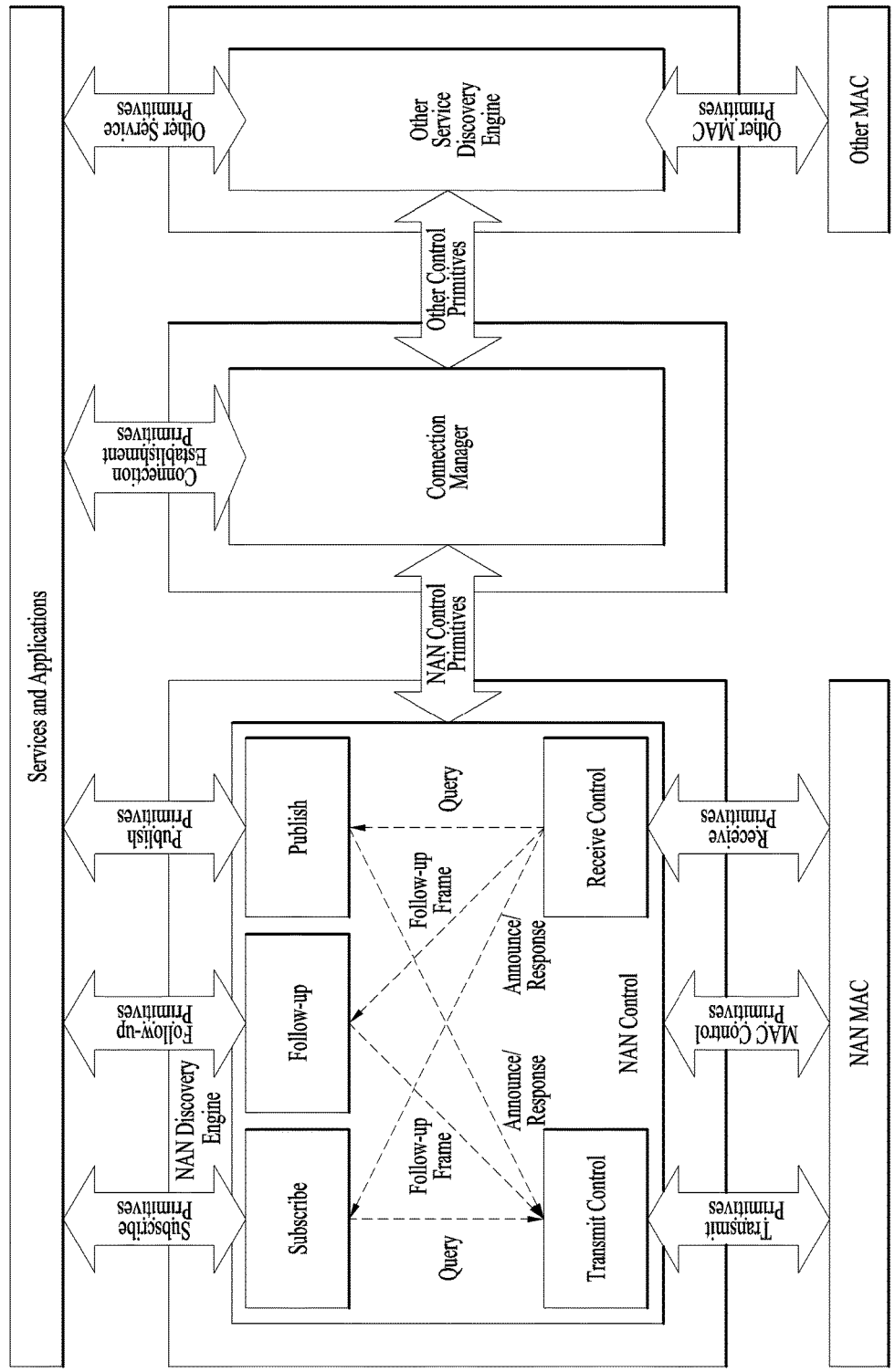

FIGS. 5 and 6 illustrate relations between NAN components. Service requests and responses are processed through the NAN discovery engine, and the NAN beacon frames and the service discovery frames are processed by the NAN MAC. The NAN discovery engine may provide functions of subscribing, publishing, and following-up. The publish/subscribe functions are operated by services/applications through a service interface. If the publish/subscribe commands are executed, instances for the publish/subscribe functions are generated. Each of the instances is driven independently and a plurality of instances can be driven simultaneously in accordance with the implementation. The follow-up function corresponds to means for the services/applications that transceive specific service information.

Role and State of NAN Device

Figure 7:
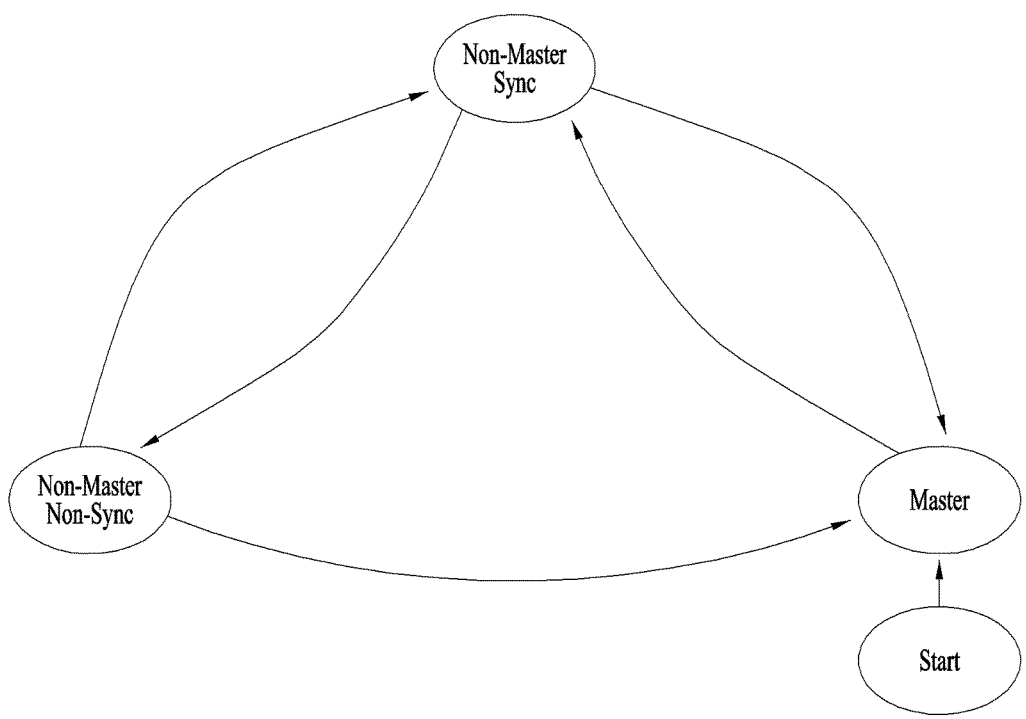
FIG. 7 is a diagram illustrating a state transition of a NAN device (terminal).

As mentioned in the foregoing description, a NAN device (terminal) can serve as a NAN master and the NAN master can be changed. In other words, roles and states of the NAN terminal can be shifted in various ways and related examples are illustrated in FIG. 7. The roles and states, which the NAN terminal can have, may include a master (hereinafter, the master means a state of master role and sync), a Non-master sync, and a Non-master Non-sync. Transmission availability of the discovery beacon frame and/or the synchronization beacon frame can be determined according to each of the roles and states and it may be set as illustrated in Table 1.

TABLE 1

| Role and State | Discovery Beacon | Synchronization Beacon |
| --- | --- | --- |
| Master | Transmission Possible | Transmission Possible |
| Non-Master Sync | Transmission Impossible | Transmission Possible |
| Non-Master Non-Sync | Transmission Impossible | Transmission Impossible |

The state of the NAN terminal can be determined according to a master rank (MR). The master rank indicates the preference of the NAN terminal to serve as the NAN master. In particular, a high master rank means strong preference for the NAN master. The NAN MR can be determined by Master Preference, Random Factor, Device MAC address, and the like according to Formula 1.

$$MasterRank = MasterPreference * 2^{56} + RandomFactor * 2^{48} + MAC[5] * 2^{40} + \ldots + MAC[0] \quad \text{[Formula 1]}$$

In Formula 1, the Master Preference, Random Factor, Device MAC address may be indicated through a master indication attribute. The master indication attributes may be set as illustrated in Table 2.

TABLE 2

| Field Name | Size (Octets) | Value | Description |
| --- | --- | --- | --- |
| Attribute ID | 1 | 0x00 | Identifies the type of NAN attribute. |
| Length | 2 | 2 | Length of the following field in the attribute |
| Master Preference | 1 | 0-255 | Information that is used to indicate a NAN Device's preference to serve as the role of Master, with a larger value indicating a higher preference. |

TABLE 2-continued

| Field Name | Size (Octets) | Value | Description |
| --- | --- | --- | --- |
| Random Factor | 1 | 0-255 | A random number selected by the sending NAN Device. |

Regarding the above MR, in case of a NAN terminal that activates a NAN service and initiates a NAN cluster, each of the Master Preference and the Random Factor is set to 0 and NANWarmUp is reset. The NAN terminal should set a Master Preference field value in the master indication attribute to a value greater than 0 and a Random Factor value in the master indication attribute to a new value until when the NANWarmUp expires. When a NAN terminal joins a NAN cluster in which the Master Preference of an anchor master is set to a value greater than 0, the corresponding NAN terminal may set the Master Preference to a value greater than 0 and the Random Factor to a new value irrespective of expiration of the NANWarmUp.

Moreover, a NAN terminal can become an anchor master of a NAN cluster depending on an MR value. That is, all NAN terminals have capabilities of operating as the anchor master. The anchor master means the device that has a highest MR and a smallest AMBTT (anchor master beacon transmit time) value and has a hop count (HC) (to the anchor master) set to 0 in the NAN cluster. In the NAN cluster, two anchor masters may exist temporarily but a single anchor master is a principle of the NAN cluster. If a NAN terminal becomes an anchor master of a currently existing NAN cluster, the NAN terminal adopts TSF used in the currently existing NAN cluster without any change.

The NAN terminal can become the anchor master in the following cases: if a new NAN cluster is initiated; if the master rank is changed (e.g., if an MR value of a different NAN terminal is changed or if an MR value of the anchor master is changed); or if a beacon frame of the current anchor master is not received any more. In addition, if the MR value of the different NAN terminal is changed or if the MR value of the anchor master is changed, the NAN terminal may lose the status of the anchor master. The anchor master can be determined according to an anchor master selection algorithm in the following description. In particular, the anchor master selection algorithm is the algorithm for determining which NAN terminal becomes the anchor master of the NAN cluster. And, when each NAN terminal joins the NAN cluster, the anchor master selection algorithm is driven.

If a NAN terminal initiates a new NAN cluster, the NAN terminal becomes the anchor master of the new NAN cluster. If a NAN synchronization beacon frame has a hop count in excess of a threshold, the NAN synchronization beacon frame is not used by NAN terminals. And, other NAN synchronization beacon frames except the above-mentioned NAN synchronization beacon frame are used to determine the anchor master of the new NAN cluster.

If receiving the NAN synchronization beacon frame having the hop count equal to or less than the threshold, the NAN terminal compares an anchor master rank value in the beacon frame with a stored anchor master rank value. If the stored anchor master rank value is greater than the anchor master value in the beacon frame, the NAN terminal discards the anchor master value in the beacon frame. If the stored anchor master value is less than the anchor master value in the beacon frame, the NAN terminal newly stores values greater by 1 than the anchor master rank and the hop count included in the beacon frame and an AMBTT value in the beacon frame. If the stored anchor master rank value is equal to the anchor master value in the beacon frame, the NAN terminal compares hop counters. Then, if a hop count value in the beacon frame is greater than a stored value, the NAN terminal discards the received beacon frame. If the hop count value in the beacon frame is equal to (the stored value−1) and if an AMBTT value is greater than the stored value, the NAN terminal newly stores the AMBTT value in the beacon frame. If the hop count value in the beacon frame is less than (the stored value−1), the NAN terminal increases the hop count value in the beacon frame by 1. The stored AMBTT value is updated according to the following rules. If the received beacon frame is transmitted by the anchor master, the AMBTT value is set to the lowest four octets of time stamp included in the received beacon frame. If the received beacon frame is transmitted from a NAN master or non-master sync device, the AMBTT value is set to a value included in a NAN cluster attribute in the received beacon frame.

Meanwhile, a TSF timer of a NAN terminal exceeds the stored AMBTT value by more than 16*512 TUs (e.g., 16 DW periods), the NAN terminal may assume itself as an anchor master and then update an anchor master record. In addition, if any of MR related components (e.g., Master Preference, Random Factor, MAC Address, etc.) is changed, a NAN terminal not corresponding to the anchor master compares the changed MR with a stored value. If the changed MR of the NAN terminal is greater than the stored value, the corresponding NAN terminal may assume itself as the anchor master and then update the anchor master record.

Moreover, a NAN terminal may set anchor master fields of the cluster attributes in the NAN synchronization and discovery beacon frames to values in the anchor master record, except that the anchor master sets the AMBTT value to a TSF value of corresponding beacon transmission. The NAN terminal, which transmits the NAN synchronization beacon frame or the discovery beacon frame, may be confirmed that the TSF in the beacon frame is derived from the same anchor master included in the cluster attribute.

Moreover, a NAN terminal may adopt a TSF timer value in a NAN beacon received with the same cluster ID in the following case: i) if the NAN beacon indicates an anchor master rank higher than a value in an anchor master record of the NAN terminal; or ii) if the NAN beacon indicates an anchor master rank equal to the value in the anchor master record of the NAN terminal and if a hop count value and an AMBTT value in the NAN beacon frame are larger values in the anchor master record.

NAN Synchronization

NAN terminals (devices) participating in the same NAN Cluster may be synchronized with respect to a common clock. A TSF in the NAN cluster can be implemented through a distributed algorithm that should be performed by all the NAN terminals. Each of the NAN terminals participating in the NAN cluster may transmit NAN synchronization beacon frame (NAN sync beacon frame) according to the above-described algorithm. The NAN device may synchronize its clock during a discovery window (DW). A length of the DW corresponds to 16 TUs. During the DW, one or more NAN terminals may transmit synchronization beacon frames in order to help all NAN terminals in the NAN cluster synchronize their own clocks.

NAN beacon transmission is distributed. A NAN beacon frame is transmitted during a DW period existing at every 512 TU. All NAN terminals can participate in generation and transmission of the NAN beacon according to their roles and states. Each of the NAN terminals should maintain its own TSF timer used for NAN beacon period timing. A NAN synchronization beacon interval can be established by the NAN terminal that generates the NAN cluster. A series of TBTTs are defined so that the DW periods in which synchronization beacon frames can be transmitted are assigned exactly 512 TUs apart. Time zero is defined as a first TBTT and the discovery window starts at each TBTT.

Figure 8:
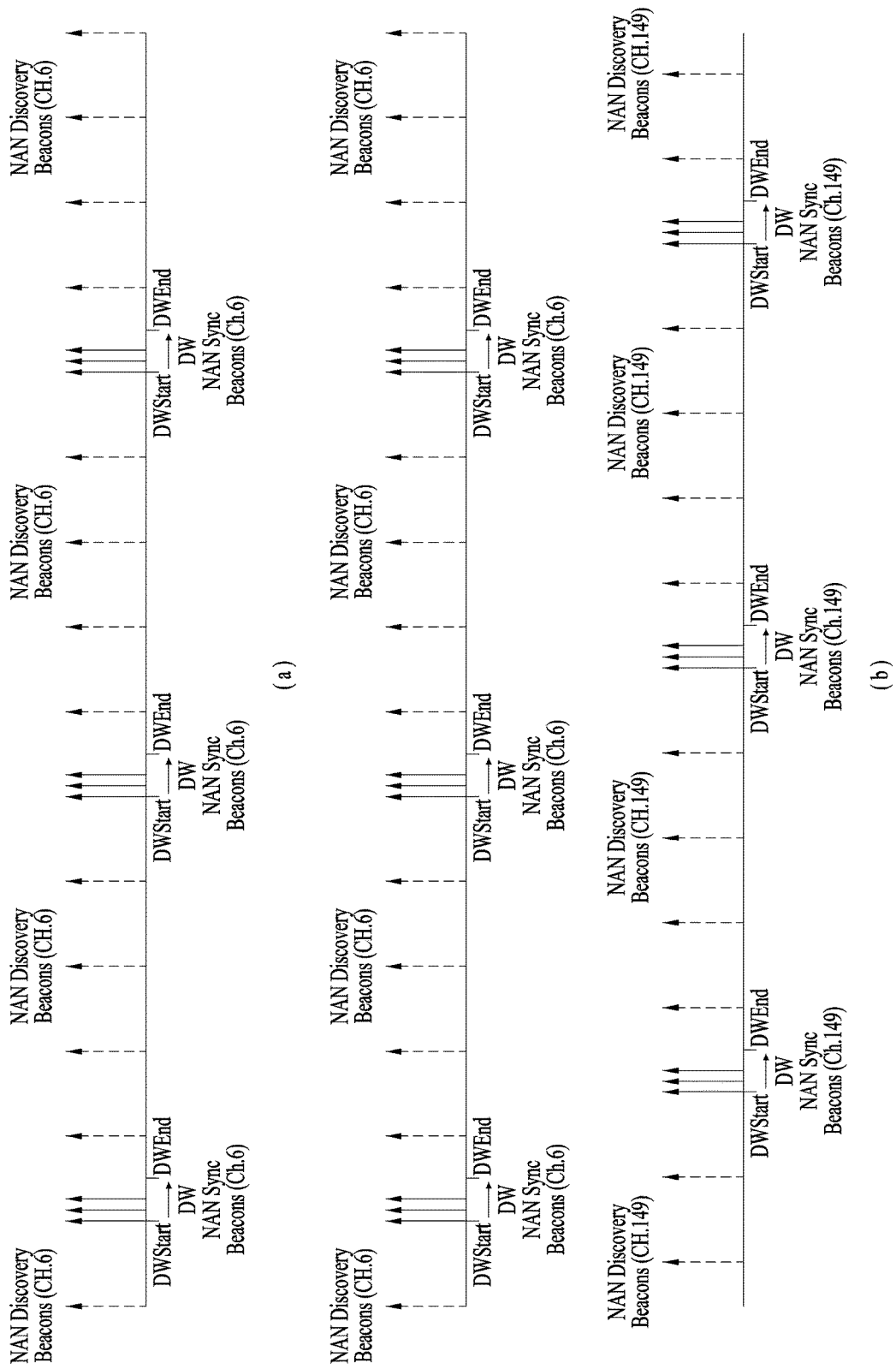

Each NAN terminal serving as a NAN master transmits a NAN discovery beacon frame from out of a NAN discovery window. On average, the NAN terminal serving as the NAN master transmits the NAN discovery beacon frame every 100 TUs. A time interval between consecutive NAN discovery beacon frames is smaller than 200 TUs. If a scheduled transmission time overlaps with a NAN discovery window of the NAN cluster in which the corresponding NAN terminal participates, the NAN terminal serving as the NAN master is able to omit transmission of the NAN discovery beacon frame. In order to minimize power required to transmit the NAN discovery beacon frame, the NAN terminal serving as the NAN master may use AC_VO (WMM Access Category-Voice) contention setting. FIG. 8 illustrates relations between a discovery window and a NAN discovery beacon frame and transmission of NAN synchronization/discovery beacon frames. Particularly, FIG. 8 (*a*) shows transmission of NAN discovery and synchronization beacon frames of a NAN terminal operating in 2.4 GHz band. FIG. 8 (*b*) shows transmission of NAN discovery and synchronization beacon frames of a NAN terminal operating in 2.4 GHz and 5 GHz bands.

State Transition of NAN Terminal

As described above, a NAN terminal can transition between Non-Master Non-Sync, Non-Master Sync, Master states. And, the state transition can be performed according to a result of comparison of RSSIs, AMRs, hop counts, and the like in synchronization beacon frames. In the following description, RSSI_middle may be greater than −60 dBm and RSSI_close may be greater than −75 dBm and less than the RSSI_middle.

A state transition from the Master state to the Non-Master Sync state may occur in the following cases. First of all, when a synchronization beacon frame with RSSI higher than the RSSI_close is received and a master rank of a device transmitting the synchronization beacon frame is higher than that of a receiving terminal, the state transition may occur. Secondly, when RSSIs higher than the RSSI_middle are received from three or more NAN devices and each master rank is higher than that of a receiving terminal, the state transition may occur.

A state transition from the Non-Master state to the Master state may occur when a NAN terminal fails to receive a synchronization beacon frame with RSSI higher than a first value in a NAN cluster and a master rank of a device transmitting the NAN synchronization beacon frame is higher than that of the NAN terminal. Alternatively, the above state transition may occur when a NAN terminal fails to receive synchronization beacon frames with RSSI higher than a second value (RSSI_middle) from less than three NAN terminals and a master rank of each less than three NAN terminals is higher than that of a receiving terminal.

A state transition from the Non-Master Sync state to the Non-Master Non-Sync state may occur when a synchronization beacon frame with RSSI higher than the RSSI_close is received, AMR of the synchronization beacon frame is equal to that of a NAN device, and a hop count of a device transmitting the synchronization beacon frame is lower than that of the NAN device. Alternatively, the above state transition may occur in the following case: a synchronization beacon frame with RSSI higher than the RSSI_close is received; AMR of the synchronization beacon frame is equal to that of a NAN device; hop counts are equal to each other; and MR of a device transmitting the synchronization beacon frame is higher than that of the NAN terminal. Alternatively, the state transition may occur in the following case: synchronization beacon frames with RSSI higher than the RSSI_middle are received from three or more NAN devices; AMR of the synchronization beacon frame is equal to that of a NAN terminal; and a hop count of a device transmitting the synchronization beacon frame is lower than that of the NAN device. Alternatively, the state transition may occur in the following case: synchronization beacon frames with RSSI higher than the RSSI_middle are received from three or more NAN devices; AMR of the synchronization beacon frame is equal to that of a NAN terminal; and MR of a device transmitting the synchronization beacon frame is higher than that of the NAN terminal.

A state transition from the Non-Master Non-Sync state to the Non-Master Sync state may be performed at the end of DW in the following case: a synchronization beacon frame with RSSI higher than the RSSI_close is not received; AMR of the synchronization beacon frame is equal to that of a NAN terminal; and a hop count of the synchronization beacon frame is lower than that of the NAN terminal. Alternatively, the state transition may be performed at the end of DW in the following case: a synchronization beacon frame with RSSI higher than the RSSI_close is not received; AMR of the synchronization beacon frame is equal to that of a NAN terminal; hop count values are equal to each other; and MR of a device transmitting the synchronization beacon frame is higher than that of the NAN terminal. Alternatively, the state transition may be performed at the end of DW in the following case: synchronization beacon frames with RSSI higher than the RSSI_middle are received from equal to or less than three NAN devices; AMR of the synchronization beacon frame is equal to that of a NAN terminal; and a hop count of the synchronization beacon frame is lower than that of the NAN terminal. Alternatively, the state transition may be performed at the end of DW in the following case: synchronization beacon frames with RSSI higher than the RSSI middle are received from equal to or less than three NAN devices; AMR of the synchronization beacon frame is equal to that of a NAN terminal; hop count values are equal to each other; and MR of a device transmitting the synchronization beacon frame is higher than that of the NAN terminal.

As described above, according to an existing NAN system, the state transition is performed when conditions defined for each transition between the Master, Non-Master Sync, and Non-Master Non-Sync states are satisfied. However, there may be cases where a rapid state transition is necessary. That is, in the case of the state transition of the existing NAN system, many processes are required and thus it is not efficient for the rapid state transition. For instance, referring to FIG. 9, in case that two anchor masters (i.e., AM1 and AM2) are present, if a state transition is performed according to the methods defined in the existing NAN system, it cannot solve the situation in which the two anchor master exist.

Figure 9:
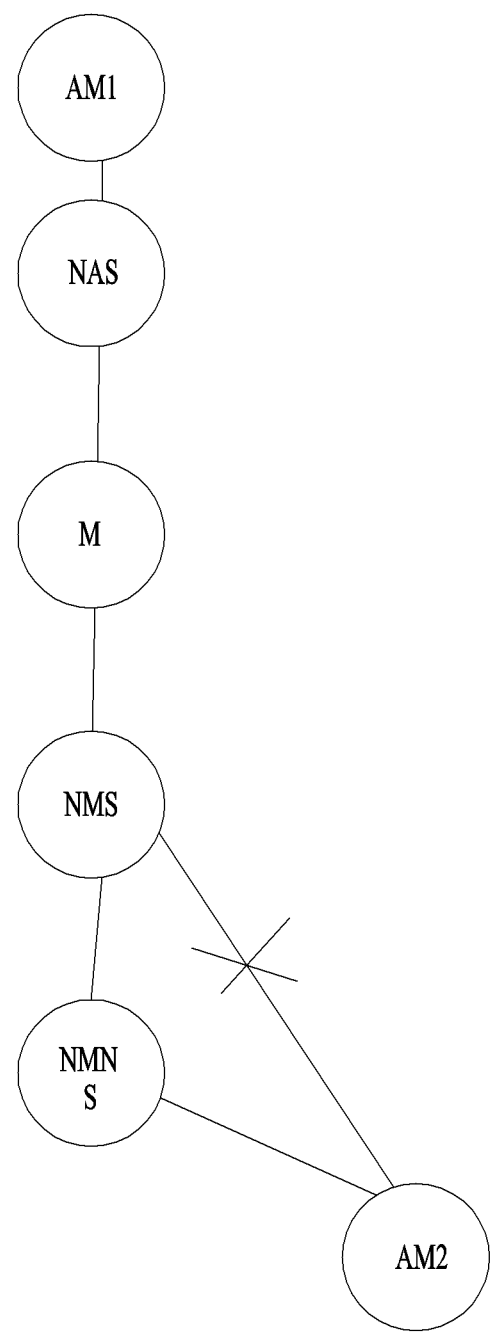
FIG. 9 is a diagram for explaining an embodiment of the present invention.

In the situation illustrated in FIG. 9, NAN terminals may match synchronization according to synchronization beacon frames sequentially transmitted from a first anchor master (AM1) and then perform anchor master selection. At the same time, it is assumed that a Non-Master Sync (NMS) terminal capable of transmitting a synchronization beacon frame cannot receive a synchronization beacon frame from a second anchor master (AM2). In this case, the only way of forwarding the synchronization beacon frame from the AM2 is that a Non-Master Non-Sync (NMNS) terminal transmits it after transitioning to a state capable of transmitting a synchronization beacon frame. In other words, after the NMNS terminal performs the state transition and then transmits the synchronization beacon frame, other NAN terminals (i.e., M, NAS, and NMS) may select one of the two anchor masters as their anchor master. Thus, the situation in which the two anchor master exist may last for a relatively long time. Hereinafter, a description will be given of a new state transition that can be more efficiently applied to the above situation.

State Transition of Terminal in Non-Master Non-Sync State

A NAN terminal may receive a first synchronization beacon frame and receive a second synchronization beacon frame after the reception of the first synchronization beacon frame. In this case, if anchor master information included in the first synchronization beacon frame is different from that included in the second synchronization beacon frame and the terminal is in the Non-Master Non-Sync state, the NAN terminal may transition to a state capable of transmitting a synchronization beacon frame regardless of RSSI (received signal strength indicator) of the synchronization beacon frame. Alternatively, if anchor master information stored in the NAN terminal is different from that included in the second synchronization beacon frame and the terminal is in the Non-Master Non-Sync state, the NAN terminal may transition to the state capable of transmitting the synchronization beacon frame regardless of the RSSI (received signal strength indicator) of the synchronization beacon frame.

In this case, the state capable of transmitting the synchronization beacon frame means the Non-Master Sync state or Master Sync state. The anchor master information may include an anchor master rank, a hop count to an anchor master, and an anchor master beacon transmission time.

In other words, if the NAN terminal in the Non-Master Non-Sync state receives the synchronization beacon frames from different anchor masters, the NAN terminal can transition to the state capable of transmitting the synchronization beacon frame, i.e., the Non-Master Sync state or Master Sync state.

If anchor master rank information included in the first synchronization beacon frame is equal to that included in the second synchronization beacon frame and the NAN terminal is in the Non-Master Non-Sync state, the NAN terminal performs a state transition on the basis of RSSI of the second synchronization beacon frame. For instance, if the RSSI of the second synchronization beacon frame is lower than the RSSI_close, an anchor master rank of the second synchronization beacon frame is equal to that of the NAN terminal, and a hop count of the second synchronization beacon frame is lower than that of the NAN terminal, the NAN terminal may transition to the Non-Master Sync state. Alternatively, if the RSSI of the second synchronization beacon frame is lower than the RSSI_close, the anchor master rank of the second synchronization beacon frame is equal to that of the NAN terminal, the hop count of the second synchronization beacon frame is equal to that of the NAN terminal, and a master rank of the second synchronization beacon frame is lower than that of the NAN terminal, the NAN terminal may transition to the Non-Master Sync state.

According to above-mentioned configuration, if receiving a synchronization beacon frame from a first anchor master (AM1) and a synchronization beacon frame from a second anchor master (AM2), a terminal in the Non-Master Non-Sync state shown in FIG. 9 may transition to the Non-Master Sync state or Master Sync state immediately. The NAN terminal may transmit a synchronization beacon frame after the state transition. In addition, after receiving the synchronization beacon frame from the NAN terminal, other terminals may select one of the first anchor master and second anchor master as an anchor master. Therefore, compared to the previously defined state transition rule, anchor master selection can be performed rapidly.

Other State Transition Rules

Hereinafter, a description will be given of NAN state transition rules according to another embodiment of the present invention. At least one of state transition rules in the following description may be used together with the aforementioned state transition rule for a NAN terminal in the Non-Master Non-Sync state unless they contradict each other. It is a matter of course that each of the following state transition rules can be used independently or together with the other.

If a NAN terminal in the Non-Master Non-Sync state needs to perform updates due to anchor master selection after receiving a synchronization beacon frame from an anchor master, the NAN terminal may transition to a state capable of transmitting a synchronization beacon frame i.e., the Non-Master Sync state or Master Sync state.

The NAN terminal in the Non-Master Non-Sync state may transmit the synchronization beacon frame in a reception DW interval (e.g., a certain part of the last interval or a random interval) or a next DW interval according to a predetermined format (e.g., a predetermined specific variable (value)).

If a role of the NAN terminal is either an anchor master or a master and the NAN terminal fails to transmit (or has a delay in transmitting) discovery beacon frames predetermined times or more during a prescribed period (e.g., 100 ms), a master rank value may be changed to a predetermined value. Alternatively, if the state of the NAN terminal is either the anchor master or the master and the NAN terminal fails to transmit discovery beacon frames predetermined times or more during the prescribed period, the NAN terminal changes its current state and then maintains its master preference or master rank value. Alternatively, the NAN terminal performs the following operations: i) immediate change of the master preference to a low level during a NAN cluster operation or ii) change of the master rank value to a predetermined value except for a previously configured value. Thereafter, if a value related to a channel state becomes equal to or greater than the predetermined value (i.e., if the channel state is improved), the NAN terminal may restore the anchor master value to the value before the change.

When the NAN terminal fails to transmit synchronization beacon frames in more than a predetermined number of discovery windows, the NAN terminal changes the master rank value to the predetermined value or maintains the master rank value after changing its state. Alternatively, the NAN terminal performs the following operations: i) immediate change of the master preference to a low level during the NAN cluster operation or ii) change of the master rank value to the predetermined value except for the previously configured value. Thereafter, if the value related to the channel state becomes equal to or greater than the predetermined value (i.e., if the channel state is improved), the NAN terminal may restore the anchor master value to the value before the change.

When the NAN terminal enters a power save mode, the NAN terminal may transition to the Non-Master Non-Sync state. In this case, the NAN terminal may transmit only a service discovery frame. In addition, the NAN terminal may transition to the Non-Master Non-Sync state in consideration of a remaining power capacity.

Figure 10:
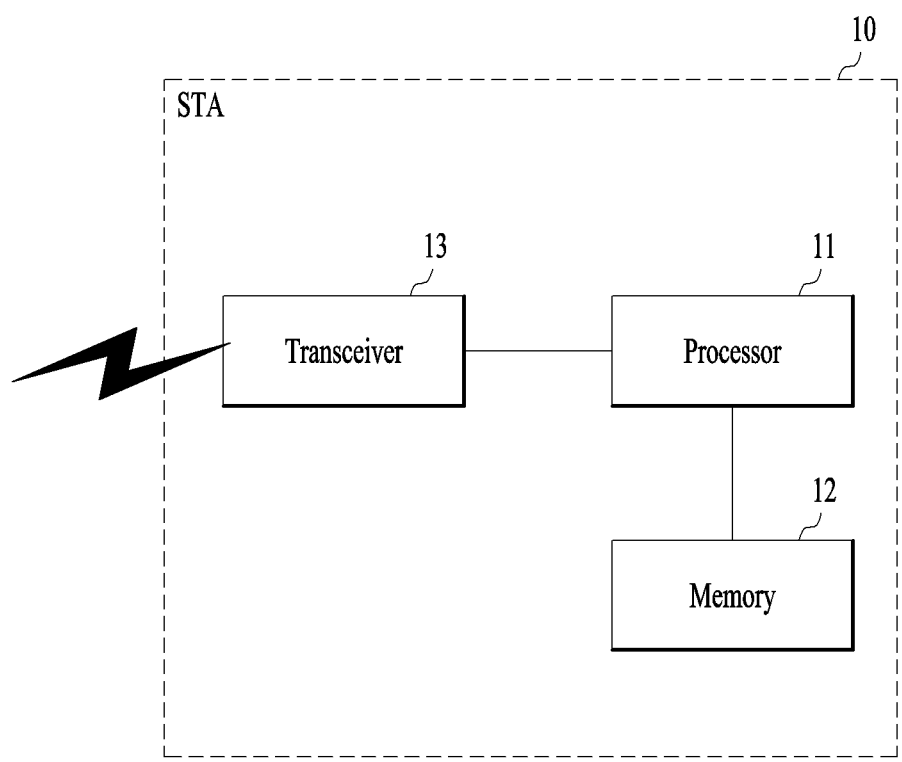
FIG. 10 is a block diagram illustrating a configuration of a wireless device according to one embodiment of the present invention.

FIG. 10 is a block diagram illustrating a configuration of a wireless device according to one embodiment of the present invention.

Referring to FIG. 10, a wireless device 10 may include a processor 11, a memory 12, and a transceiver 13. The transceiver 13 can transmit/receive radio signals and implement a physical layer according to, for example, IEEE 802 system. The processor 11 is connected to the transceiver 13 electrically and can then implement the physical layer and/or a MAC layer according to the IEEE 802 system. Moreover, the processor 11 may be configured to perform at least one operation of the application, the service and the ASP layer according to the various embodiments of the present invention mentioned in the foregoing description. Alternatively, the processor 11 may be configured to perform operations related to a device operating as an AP/STA. Moreover, a module for implementing the operations of the wireless device according to the various embodiments of the present invention mentioned in the foregoing description may be saved in the memory 12 and then driven by the processor 11. The memory 12 may be included inside the processor 11 or be provided outside the processor 11. And, the memory 12 can be connected to the processor 11 through known means.

The detailed configuration of the wireless device 10 in FIG. 10 may be implemented such that each of the various embodiments of the present invention described above is applied independently or at least two thereof are simultaneously applied. And, redundant description shall be omitted for clarity.

The embodiments of the present invention mentioned in the foregoing description can be implemented using various means. For instance, the embodiments of the present invention can be implemented using hardware, firmware, software and/or any combinations thereof.

In case of the implementation by hardware, a method according to the embodiments of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to the embodiments of the present invention can be implemented by modules, procedures, and/or functions for performing the above-explained functions or operations. Software code is stored in the memory unit and can be driven by the processor. The memory unit is provided within or outside the processor to exchange data with the processor through the various means known to the public As mentioned in the foregoing description, the detailed descriptions for the preferred embodiments of the present invention are provided to enable those skilled in the art to implement and practice the invention. While the present invention has been described herein with reference to the preferred embodiments thereof, it will be apparent to those skilled in the art that various modifications and variations can be made therein without departing from the spirit and scope of the invention. Therefore, the present invention is not limited to the embodiments disclosed herein but intends to give a broadest scope that matches the principles and new features disclosed herein.

INDUSTRIAL APPLICABILITY

Although the various embodiments of the present invention have been described above mainly with reference to an IEEE 802.11 system, the present invention can be applied to various mobile communication systems in the same manner.

What is claimed is:

1. A method for changing a state of a neighbor awareness networking (NAN) terminal, which is performed by the NAN terminal in a wireless communication system, the method comprising:
receiving, from a first anchor master, a first synchronization beacon frame; and
receiving, from a second anchor master, a second synchronization beacon frame after the reception of the first synchronization beacon frame;
changing the state of the NAN terminal to a state capable of transmitting a synchronization beacon frame, regardless of an received signal strength indicator (RSSI) of the first synchronization beacon frame and an RSSI of the second synchronization beacon frame, when anchor master information included in the first synchronization beacon frame is different from anchor master information included in the second synchronization beacon frame and the NAN terminal is in a Non-Master Non-Sync state;
changing a master rank value to a predetermined value when the state of the NAN terminal is either an anchor master or a master and the NAN terminal fails to transmit discovery beacon frames a predetermined number of times or more during a prescribed period; and
restoring the master rank value to a value before the change of the master rank value when a value related to a channel state becomes equal to or greater than the predetermined value.

2. The method of claim 1, wherein each of the anchor master information included in the first synchronization beacon frame and the anchor master information included in the second synchronization beacon frame comprises an anchor master rank, a hop count to an anchor master, and an anchor master beacon transmission time.

3. The method of claim 1, wherein the state capable of transmitting the synchronization beacon frame corresponds to either a Non-Master Sync state or a Master Sync state.

4. The method of claim 1, further comprising:
changing the state of the NAN terminal based on the RSS of the second synchronization beacon frame when the anchor master information included in the first synchronization beacon frame is equal to the anchor master information included in the second synchronization beacon frame and the NAN terminal is in the Non-Master Non-Sync state.

5. The method of claim 1, further comprising:
changing the master rank value to the predetermined value when the NAN terminal fails to transmit synchronization beacon frames in more than a predetermined number of discovery windows.

6. The method of claim 1, further comprising:
changing the state of the NAN terminal to the Non-Master Non-Sync state when the NAN terminal enters a power save mode.

7. The method of claim 6, further comprising:
transmitting only a service discovery frame when the state of the NAN terminal is the Non-Master Non-Sync state.

8. The method of claim 4, further comprising:
changing the state of the NAN terminal to a Non-Master Sync state when the RSSI of the second synchronization beacon frame is lower than RSSL_close, an anchor master rank of the second synchronization beacon frame is equal to an anchor master rank of the NAN terminal, and a hop count of the second synchronization beacon frame is lower than a hop count of the NAN terminal.

9. The method of claim 4, further comprising:
changing the state of the NAN terminal to a Non-Master Sync state when the RSSI of the second synchronization beacon frame is lower than RSSI_close, an anchor master rank of the second synchronization beacon frame is equal to an anchor master rank of the NAN terminal, a hop count of the second synchronization beacon frame is equal to a hop count of the NAN terminal, and a master rank of the second synchronization beacon frame is higher than a master rank of the NAN terminal.

10. A neighbor awareness networking (NAN) terminal in a wireless communication system, comprising:
a transceiver; and
a processor configured to:
control the transceiver to receive a first synchronization beacon frame and receive a second synchronization beacon frame after the reception of the first synchronization beacon frame;
change a state of the NAN terminal to a state a state capable of transmitting a synchronization beacon frame, regardless of a received signal strength indicator (RSSI) of the first synchronization beacon frame and an RSSI of the second synchronization beacon frame, when anchor master information included in the first synchronization beacon frame is different from anchor master information included in the second synchronization beacon frame and the NAN terminal is in a Non-Master Non-Sync state frame;
change a master rank value to a predetermined value when the state of the NAN terminal is either an anchor master or a master and the NAN terminal fails to transmit discovery beacon frames a predetermined number of times or more during a prescribed period; and
restore the master rank value to a value before the change of the master rank value when a value related to a channel state becomes equal to or greater than the predetermined values.

* * * * *